US009873608B2

(12) United States Patent
Remfry (10) Patent No.: US 9,873,608 B2
(45) Date of Patent: Jan. 23, 2018

(54) SHUT OFF VALVE

(71) Applicant: Leigh Remfry, Waterlooville (GB)

(72) Inventor: Leigh Remfry, Waterlooville (GB)

( * ) Notice: Subject to any disclaimer, the term of this patent is extended or adjusted under 35 U.S.C. 154(b) by 0 days.

(21) Appl. No.: 15/315,748

(22) PCT Filed: Jun. 2, 2015

(86) PCT No.: PCT/GB2015/051611
§ 371 (c)(1),
(2) Date: Dec. 2, 2016

(87) PCT Pub. No.: WO2015/185921
PCT Pub. Date: Dec. 10, 2015

(65) Prior Publication Data
US 2017/0107095 A1 Apr. 20, 2017

(30) Foreign Application Priority Data
Jun. 2, 2014 (GB) .................................. 1409747.1

(51) Int. Cl.
| | |
|---|---|
| *B67D 7/46* | (2010.01) |
| *F16K 25/02* | (2006.01) |
| *F16K 21/18* | (2006.01) |
| *F16K 31/18* | (2006.01) |
| *B67D 7/04* | (2010.01) |
| *B60K 15/04* | (2006.01) |
| *B60K 15/03* | (2006.01) |

(52) U.S. Cl.
CPC ............ *B67D 7/46* (2013.01); *B60K 15/0406* (2013.01); *B67D 7/04* (2013.01); *F16K 21/18* (2013.01); *F16K 25/02* (2013.01); *F16K 31/18* (2013.01); *B60K 2015/03289* (2013.01); *B60K 2015/0461* (2013.01)

(58) Field of Classification Search
CPC .... B67D 7/42; B67D 7/44; B67D 7/46; F16K 21/16; F16K 21/18; B60K 2015/03289
USPC ................ 141/198, 199, 204, 212, 216, 350
See application file for complete search history.

(56) References Cited

U.S. PATENT DOCUMENTS 3,929,155 A * 12/1975 Garretson ............... F16K 31/18
137/430
6,257,287 B1 * 7/2001 Kippe ............. B60K 15/03504
137/202

(Continued)

FOREIGN PATENT DOCUMENTS

| EP | 1526319 | 4/2005 |
| GB | 2503197 | 12/2013 |
| WO | 2009/026607 | 3/2009 |

*Primary Examiner* — Timothy L Maust
(74) *Attorney, Agent, or Firm* — Bay State IP, LLC (57) ABSTRACT

A refuelling coupling having a shut off valve for a refuelling system has an annular member equipped with a connector for a pressure refuelling nozzle. A main sleeve extends down from the annular member within the skirt. The sleeve has an annular valve seat and a circular cylindrical distal end section. The seat has a conical face facing obliquely inwards and downwards. Below the valve seat, a plurality of peripherally arranged openings are provided in the end section. An end cap is screwed on across the very end of the lower portion, closing it with ports in the end cap. It also has an inner sleeve extending back up centrally to the level of the valve seat. The end cap is open inwards of the inner sleeve.

18 Claims, 10 Drawing Sheets

(56) References Cited

U.S. PATENT DOCUMENTS

| | | | |
|---|---|---|---|
| 7,886,781 B2 * | 2/2011 | Burkholder | B67D 7/362 141/198 |
| 8,281,823 B2 * | 10/2012 | Mitrovich | B60K 15/04 137/413 |
| 8,550,128 B2 * | 10/2013 | Mitrovich | B67D 7/005 137/413 |

* cited by examiner

SHUT OFF VALVE

CROSS REFERENCE TO RELATED APPLICATION

This application is for entry into the U.S. National Phase under § 371 for International Application No. PCT/GB2015/051611 having an international filing date of Jun. 2, 2015, and from which priority is claimed under all applicable sections of Title 35 of the United States Code including, but not limited to, Sections 120, 363, and 365(c), and which in turn claims priority under 35 USC 119 to British Patent Application No. 1409747.1 filed on Jun. 2, 2014.

The present invention relates to a shut off valve for a refuelling coupling.

In our patent application No 12070538, I have described and claimed:

1. A refuelling coupling having:
   an annular member,
   a fitting on the annular member complementary to a pressure refuelling nozzle and
   a displaceable dry-break member in the coupling for normally sealing the coupling via a seal between the annular member and the dry-break member, the dry-break member being displaceable from its sealing position on connection of a pressure refuelling nozzle, the dry-break member including:
   an aperture in the displaceable dry-break member and
   a subsidiary displaceable member carried by the dry-break member, this member normally closing the aperture and being displaceable by introduction of a gravity refuelling nozzle into the aperture.

The object of the present invention is to provide shut off valve for such a refuelling coupling.

According to the invention there is provided a refuelling coupling having a shut off valve, the refuelling coupling comprising:
   an annular member,
   a fitting on the annular member complementary to a pressure refuelling nozzle,
   a displaceable dry-break member in the coupling for normally sealing the coupling via a seal between the annular member and the dry-break member, the dry-break member being displaceable from its sealing position on connection of a pressure refuelling nozzle, and
   a primary sleeve extending from the annular member to provide a pressure flow passage for receiving pressurised fuel with the dry-break member displaced into the upstream end of the pressure flow passage, the primary sleeve having:
      peripheral openings at a downstream end of the sleeve for dispensing of the pressurised fuel flowing from the flow passage;
the shut off valve comprising:
   an annular seat carried on the primary sleeve on the upstream side of the openings,
   an end cap of the sleeve having:
      an inner sleeve extending back towards the annular member and defining with the primary sleeve an annular cylinder closed by the end cap,
   an annular piston in the annular cylinder having:
      one or more openings allowing passage of pressurised fuel from within the primary sleeve to the opposite side of the annular piston and
      a formation complementary to the annular seat whereby pressurised fuel on the opposite side of the annular piston can co-operate with the annular seat and close the peripheral openings and
   a float valve with at least one closable outlet in the end cap arranged to be closed for movement of the annular piston against the annular seat when refuelling is reaching completion to close flow communication from the pressure flow passage to the openings.

Initially on connection of the pressure refuelling nozzle and start of refuelling the dry-break member has been displaced and the fuel flows from the flow passage to the openings and into a tank being filled. Within the flow passage, the fuel is at a pressure somewhat above ambient and determined by the pressure drop through opposed faces of the annular seat and the annular piston and the peripheral openings to tank ambient pressure. As the fuel level rises to the float valve, its outlet begins to close, restricting fuel flow from the outlet and applying the fuel pressure at its pressure above ambient to the annular piston. This has the same pressure applied to both sides except that adjacent the openings, the pressure is dropping to tank ambient. The nett pressure force on the annular piston is such to urge it towards the annular seat. As it moves, it restricts the gap between the opposed faces, with the result that the pressure drop rises, increasing the nett pressure force on the piston in the closing direction. The result is closure of the annular piston against the annular face and marked increase of fuel pressure in the flow passage. The pressure is felt at the refuelling pump pressure sensor and the pump is stalls and/or is switched off. Refuelling is complete and the pressure refuelling nozzle can be disconnected.

Preferably:
   the annular piston has an annular groove in its underside and inlets to the groove in its top side.

Also preferably:
   the inlets are provided in at least one metering component, preferably a metering plate secured to the top side of the annular piston, the or each meter component having at least one aperture for arranged to provide a pressure drop in fuel flowing through it into a respective one of the inlets.

Further preferably:
   the dry-break member is a plug urgeable to close the annular member and having:
      a secondary sleeve extending from the plug and within the primary sleeve, with the pressure flow passage therebetween,
      an aperture in the displaceable dry-break member and
      a subsidiary displaceable member carried by the dry-break member, this member normally closing the aperture and being displaceable by introduction of a gravity refuelling nozzle into the aperture and
   the secondary sleeve extends within the inner sleeve and the end cap is open centrally,
the arrangement being such that a gravity refuel nozzle can be passed through the aperture in the dry-break member for gravity refuelling through the secondary sleeve.

The plug can be urgeable into its closed position by springs. Conveniently these are carried on pins extending from the valve seat to the annular member and acting on a rim extending radially of the plug.

Where, as in the preferred embodiment, the diameter of the secondary sleeve is smaller than that of a displacer on the pressure refuelling nozzle, nett pressure force on the dry break member is such as to urge the plug sealingly against the displacer. Further compression in the springs contributes to sealing of the displacer on the plug. Nevertheless some leakage through the subsidiary displaceable member is possible, but the quantum of leakage is unlikely to be sufficiently high to cause a sufficient drop in pressure such as to prevent a cessation of pumping of fuel as occurs with pressure rise on closure of the annular piston against the annular seat.

A float of the float valve is preferably annular with a central opening aligned beneath the central opening of the end cap for unimpeded flow of gravity refuelling fuel.

The annular float valve could be pivoted to one side and provided with closure member at the other side for closing the end cap outlet under the annular piston, in a manner similar to that provided in a carburettor.

In the preferred embodiment, the annular float has a plurality of closure members for closing a corresponding plurality of end cap outlets. The closure members could be arranged to close the outlets with tips for closing the outlets. However in the preferred embodiment, the float valve is provided with a corresponding plurality of valve bodies, each having a radial passage interruptible by a respective one of the closure members. To further ensure interruption of flow, the closure members are arranged to have passage flow pressure applied under them in a piston and cylinder manner, to ensure valve closure.

Guide members can be provided fast with the end cap for engaging with a central opening in the annular float and guiding it in movement towards and away from the end cap. Preferably, the guide members are tongues engaging complementarily with the central opening in the annular float and the links are provided, connected at one end to the guides, at the other end to the annular float and intermediately to the closure members.

To help understanding of the invention, a specific embodiment thereof will now be described by way of example and with reference to the accompanying drawings, in which.

Figure 1:
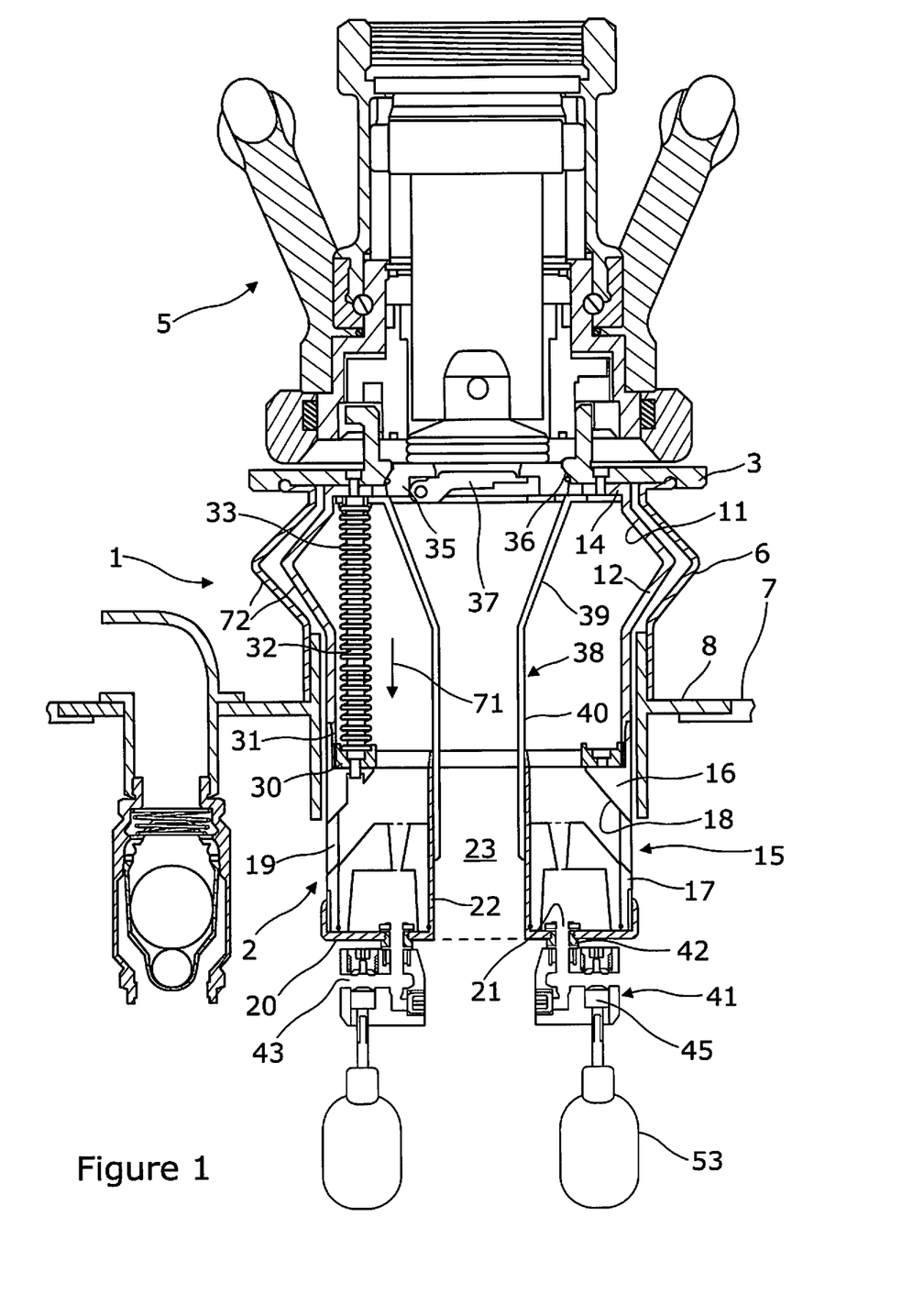
FIG. 1 is a cross-sectional view of a refuelling coupling having a shut-off valve in accordance with the invention.
Figure 2:
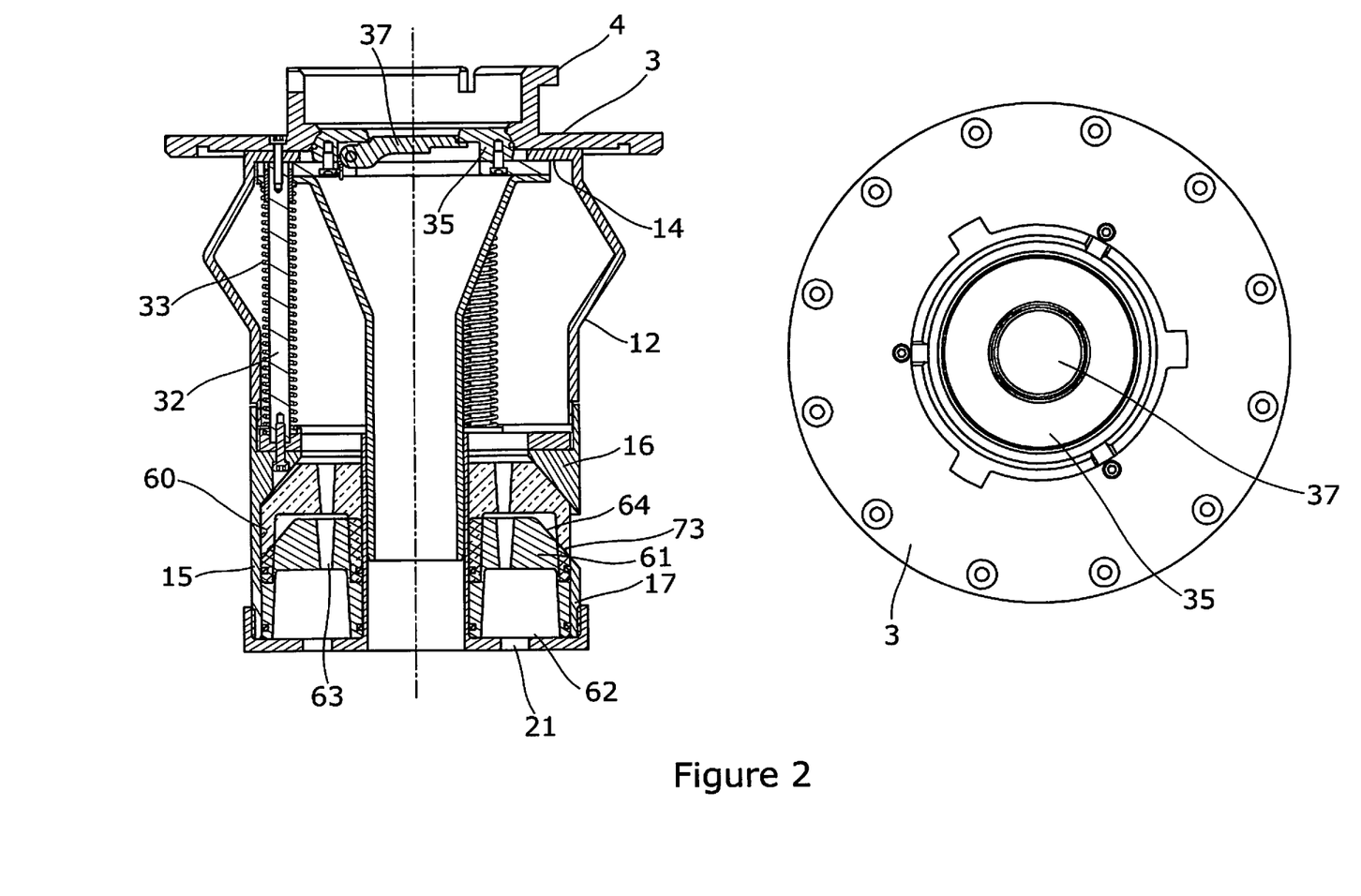
FIG. 2 are plan and cross-sectional line drawing views of the coupling and shut-off valve of FIG. 1.

Referring to the drawings and FIGS. 1 & 2 in particular, a refuelling coupling 1 having a shut off valve 2 for a refuelling system has an annular member 3 equipped with a connector 4 for a pressure refuelling nozzle 5. The latter is conventional and will not be further described in detail. The annular ring also has an annular skirt 6 connecting it to a tank 7 at a tank refill fitting 8.

A main sleeve 11 extends down from the annular member 3 within the skirt. In this embodiment, the sleeve 11 is a compound member made up of;
i) an upper portion 12 with an inwards extending flange 14 for its securement to the member 3 and
ii) a lower portion 15 with an annular valve seat 16 and a circular cylindrical distal end section 17.

The portions are screwed together immediately above the valve seat. The latter has an conical face 18 facing obliquely inwards and downwards. Below the valve seat, a plurality of peripherally arranged openings 19 are provided in the end section 17. An end cap 20 is screwed on across the very end of the lower portion 17, closing it although ports 21 are provided in the end cap. It also has an inner sleeve 22 extending back up centrally to the level of the valve seat. The end cap is open 23 inwards of the inner sleeve.

The valve seat carries a ring 30 on its top, captive by the very end 31 of the upper portion of main sleeve. From the ring, pins 32 pass up to the annular member 3 and secure the flange 14 of the main sleeve to the annular member. The pins 32 carry springs 33 urging a dry-break disc 34 upwards. This has a dry-break plug 35 which the springs normally hold up in sealing contact with the central opening 36 in the annular member. The plug 35 has a pivoted closure 37, which is openable against a torsion spring (not shown) to allow gravity refuelling centrally and via the end cap opening 23. A secondary sleeve 38 extends down from the dry-brake disc with an upper conical portion 39 and a lower parallel section 40 slidingly engaged in the inner sleeve 22.

Figure 3:
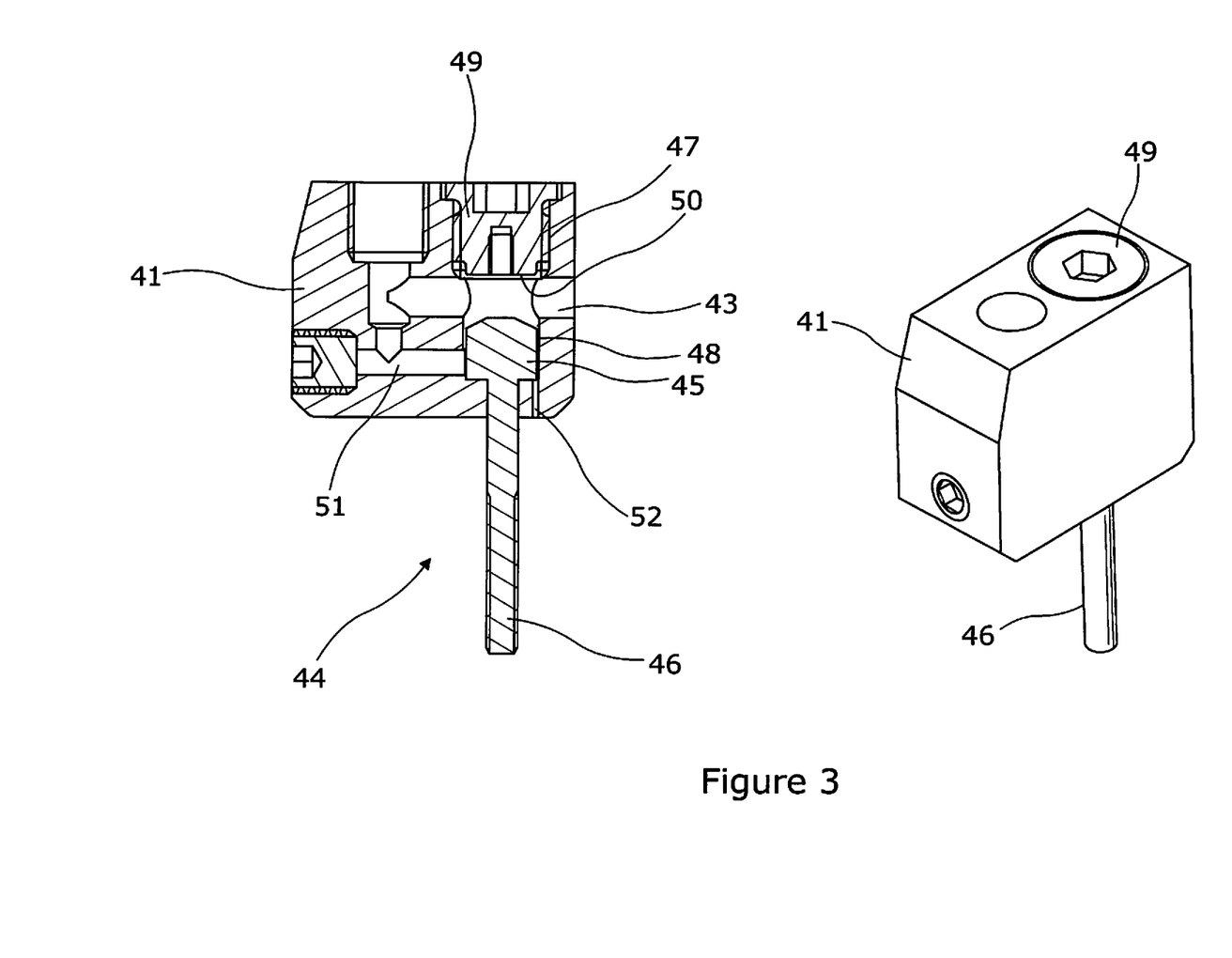
FIG. 3 is a series of line drawing views of a pilot valve of the shut-off valve.
Figure 4:
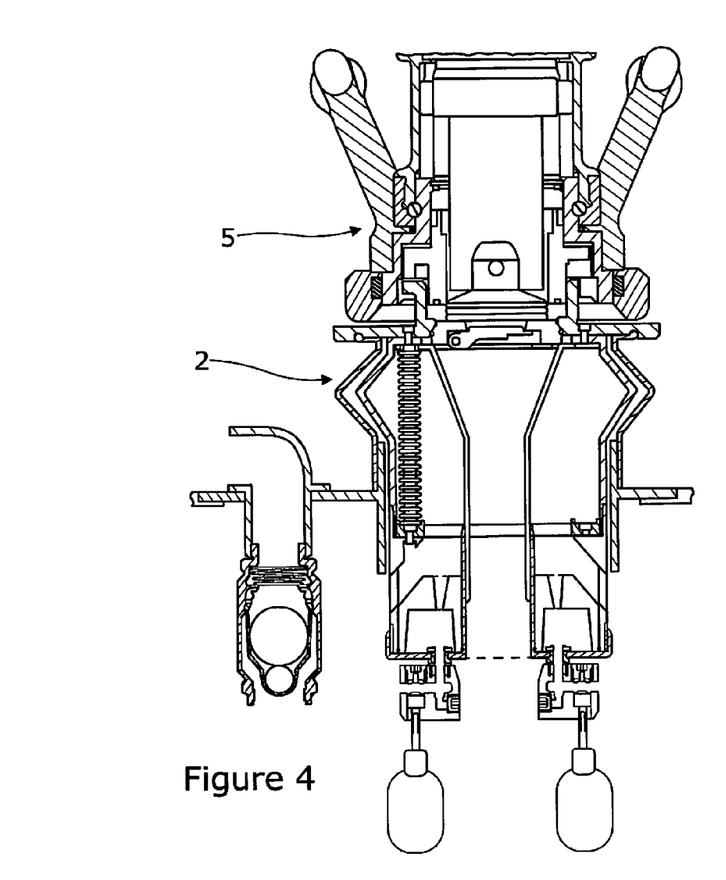
FIG. 4 is a view similar to FIG. 1 showing a pressure refuelling nozzle just connected to the refuelling coupling.
Figure 5:
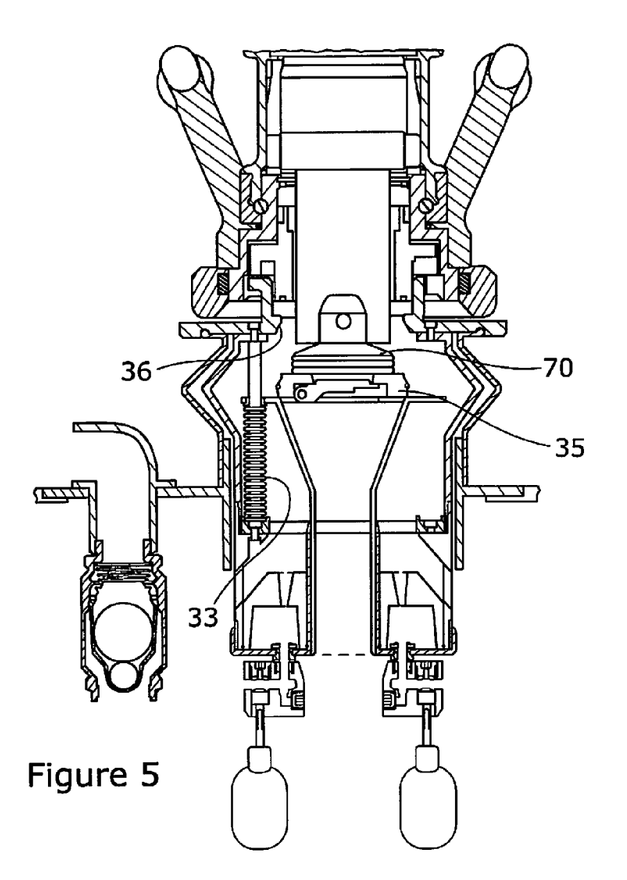
FIG. 5 is a similar view showing the nozzle fully connected.
Figure 6:
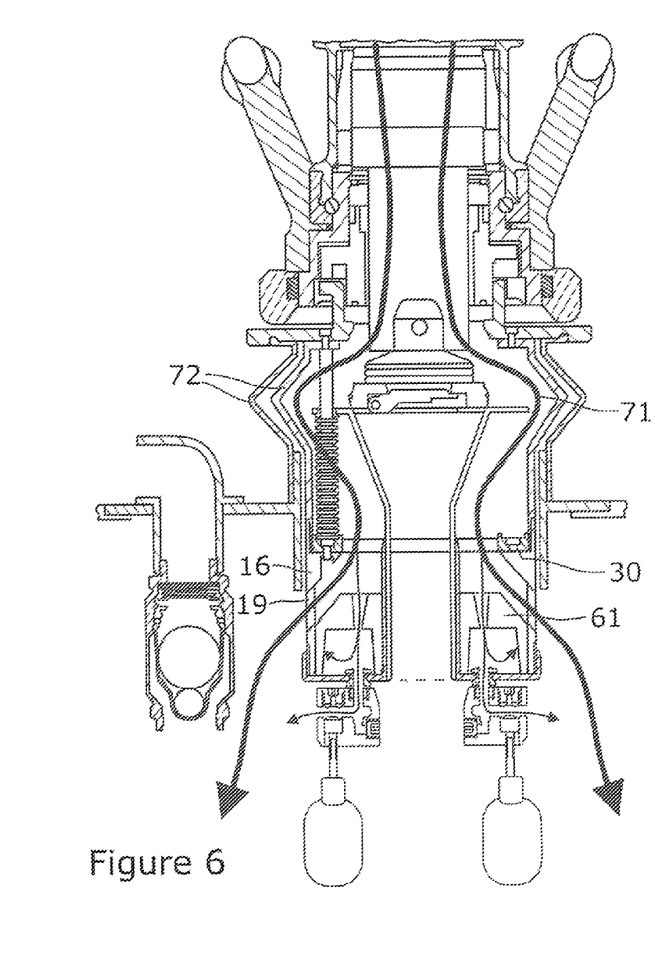
FIG. 6 shows fuel beginning to flow through the coupling and shut off valve.
Figure 7:
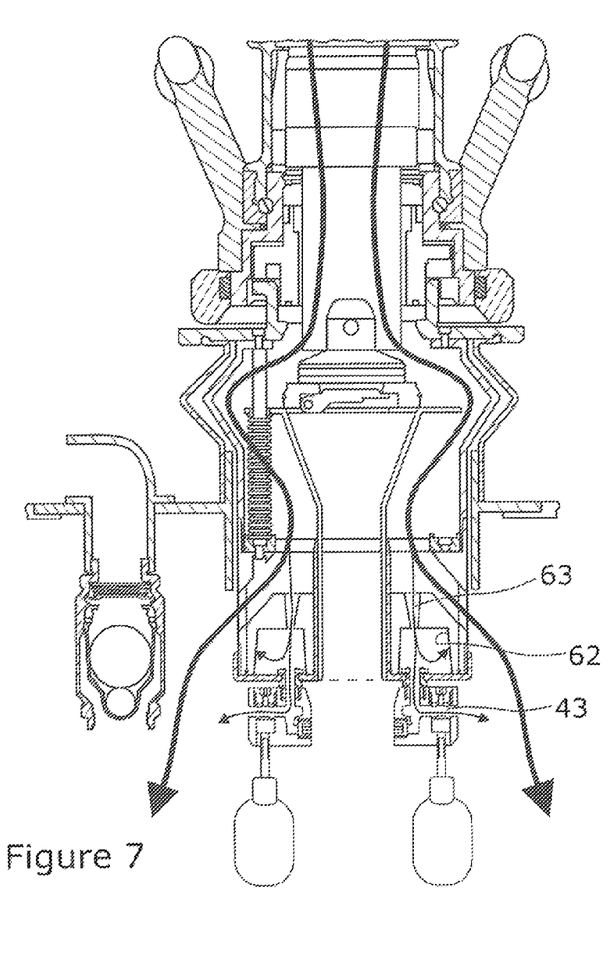
FIG. 7 shows fuel continuing to flow.
Figure 8:
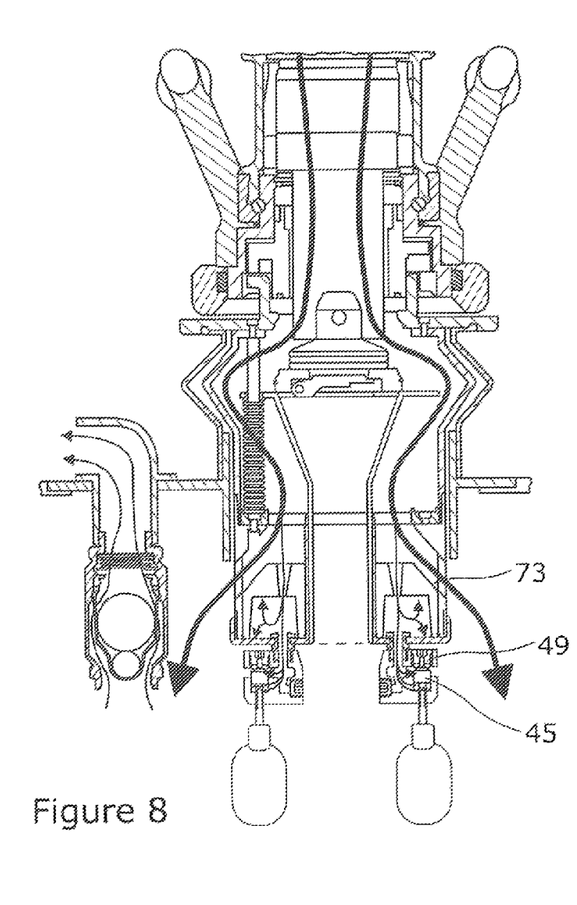
FIG. 8 shows fuel level in the tank rising to close pilot valves of the shut off valve.
Figure 9:
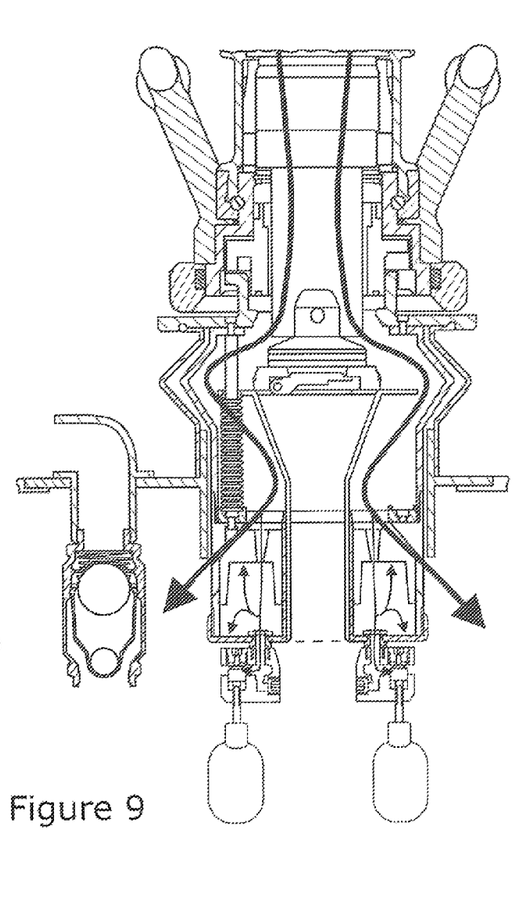
FIG. 9 shows an annular valve rising to shut off fuel flow.
Figure 10:
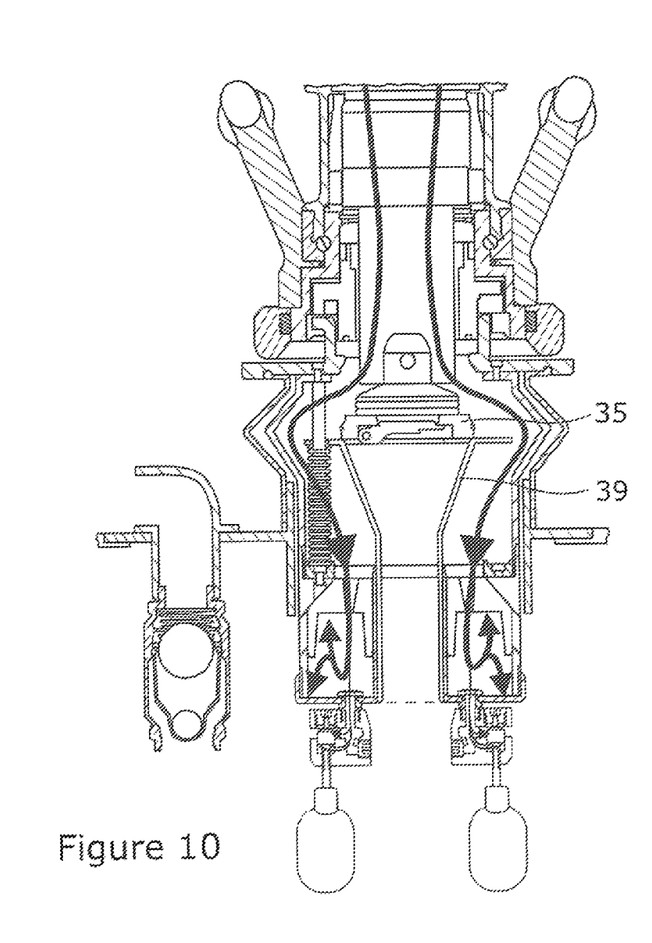
FIG. 10 shows fuel flow shut off and pressure rise in the coupling.
Figure 11:
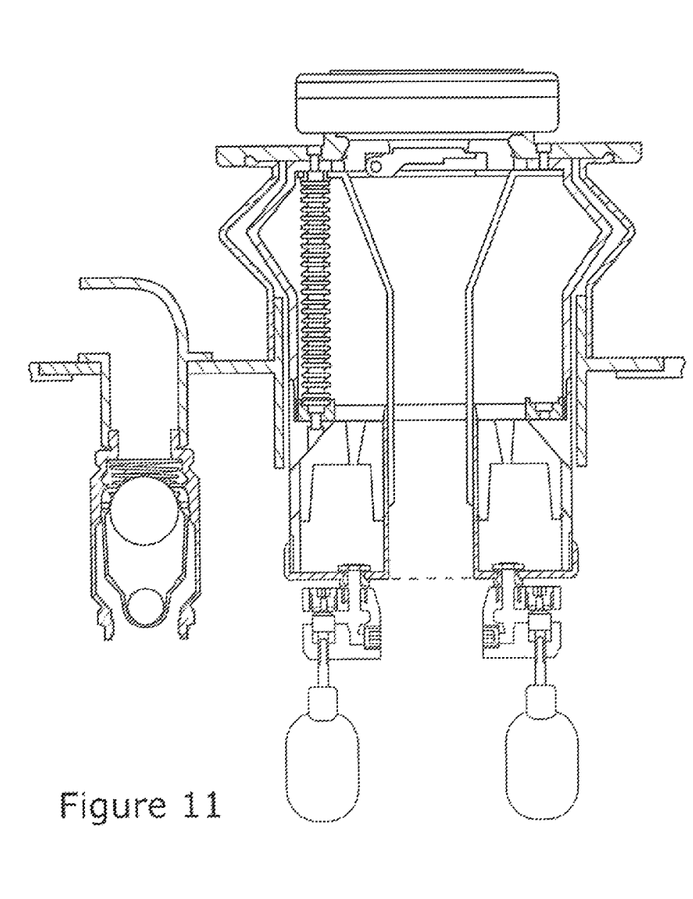
FIG. 11 shows refuelling completed with the refuelling nozzle removed.

As shown in FIG. 3, to the ports 21 are connected pilot valve bodies 41 via unions 42. The unions open into outlets 43, arranged radially of the main valve 1. Pins 44 extend transversely to the outlets 43 and have heads 45 of a larger diameter than the outlet and smaller diameter stems 46. The drillings 47, via which cylinders 48 for receiving the heads were formed, are closed by screw plugs 49 having sealing material 50 carried on their inner ends. The outlets 43 have drillings 51 to the lower ends of the cylinders 47. Small diameter drains 52 lead down from the lower ends of the cylinders. The stems 45 are fast with an annular float 53 via stems 54.

Within in the annular cylinder 60 formed by the circular cylindrical distal end section 17 of the lower portion 15 of the main sleeve, the end cap 20 and the inner sleeve 22 is slidingly accommodated an annular piston 61. It has an annular groove 62 in its underside and inlet slits 63 in its top side, which communicate with the groove. The top outer corner 64 of the piston is conically tapered to be complementary with the main valve seat 16.

Insofar as the shut off valve 2 is an integral part of the refuelling coupling, it is not a separate component and has not be described as such. However it should be noted that the valve is comprised of the following parts:
the annular seat 16,
the annular piston 61,
the part of the main sleeve and the end cap which provide the annular cylinder 60 annular piston and
the float valve comprised of the pilot valves 41 and float 53.

As shown in FIGS. 4 to 11, operation is as follows:
1. The pressure refuelling nozzle 5 is connected to the connector 4, with displacement of the dry-break member downwards/inwards by the displacer 70 of the nozzle abutting the plug 35 and moving it out of sealing engagement with the opening 36. The springs 33 are compressed close to coil bound state. Thus there exists a flow passage 71 between the main and secondary sleeves 11,38. It should be noted that this passes around the dry-break disc at upsets 72 in the skirts 6 and the upper sleeve portion 12. The passage extends through the ring 30, between the valve seat 16 and the annular piston 61 to the openings 19.

2. As filling of the tank 7 nears completion, the float 53 will start to float. With the flow rate inherent in pressure refuelling, the flow passage 71 will be completely full of fuel, which will have passed into the groove 62 in the underside of the annular piston 61. Prior to the float lifting, the fuel is free to dribble out of the outlets 43. However as the float rises, the pin heads 45, which tend to block the outlets when raised, being of larger diameter, approach the sealing ends of the plugs 49. This causes a pressure rise in the drillings 51 and the cylinders 48. This urges the heads against the plugs and flow through the outlets 43 is stopped. Flow is still possible through the drains 51, but their diameter is such that a pressure differential is maintained across them at this stage.

3. Pressure under the annular piston 61 tends to lift it. The pressure in slits 63 is applied over the entire underside of the piston. However the lower part 73 of the tapered face 64 of the piston experiences close to tank ambient pressure, with the result that there is an upwards force on the annular piston. This rises and closes against the annular valve seat 16.

4. Pressure in the flow passage 71 rises. It acts on the underside of the conical portion 39 of the secondary sleeve 38, the lower parallel section 40 being smaller in diameter than the face of the displacer in contact with the dry-break plug 35. This effect tends to urge the dry-break member up more strongly than just the force of the springs 33. Thus there is little or no flow through the plug via the pivoted closure 37.

5. The pressure is felt at the refuelling pump which slips and/or switches off stopping the refuelling operation. The refuelling nozzle is removed and the dry-break member moves us and seals. The fuel below the annular piston slow drains away once the pin heads have dropped with fuel weeping from the drains 52. The annular piston drops down.

Figure 12:
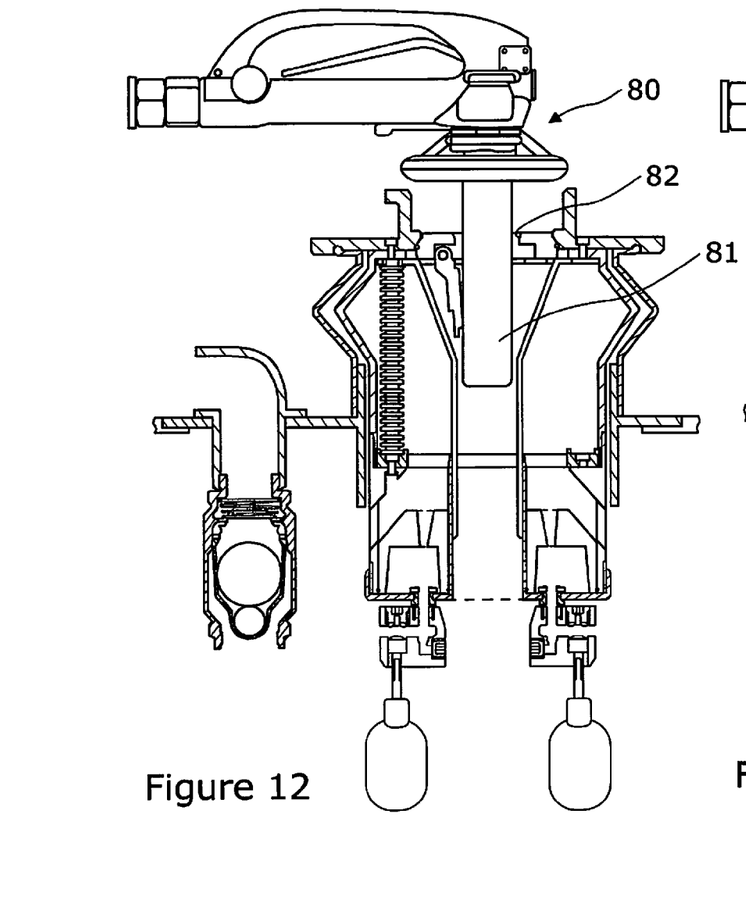
FIG. 12 shows a gravity refuel nozzle being positioned in the coupling for the gravity refuelling.
Figure 13:
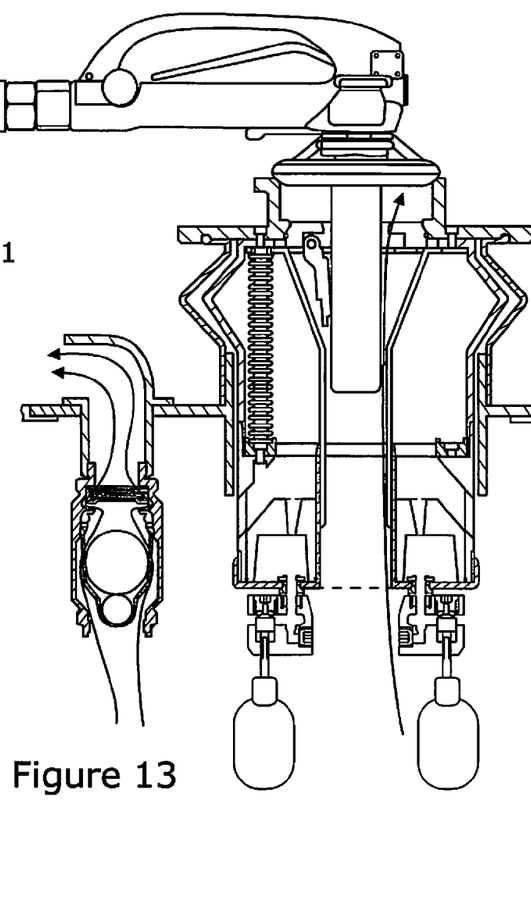
FIG. 13 shows gravity refuelling in progress.
Figure 14:
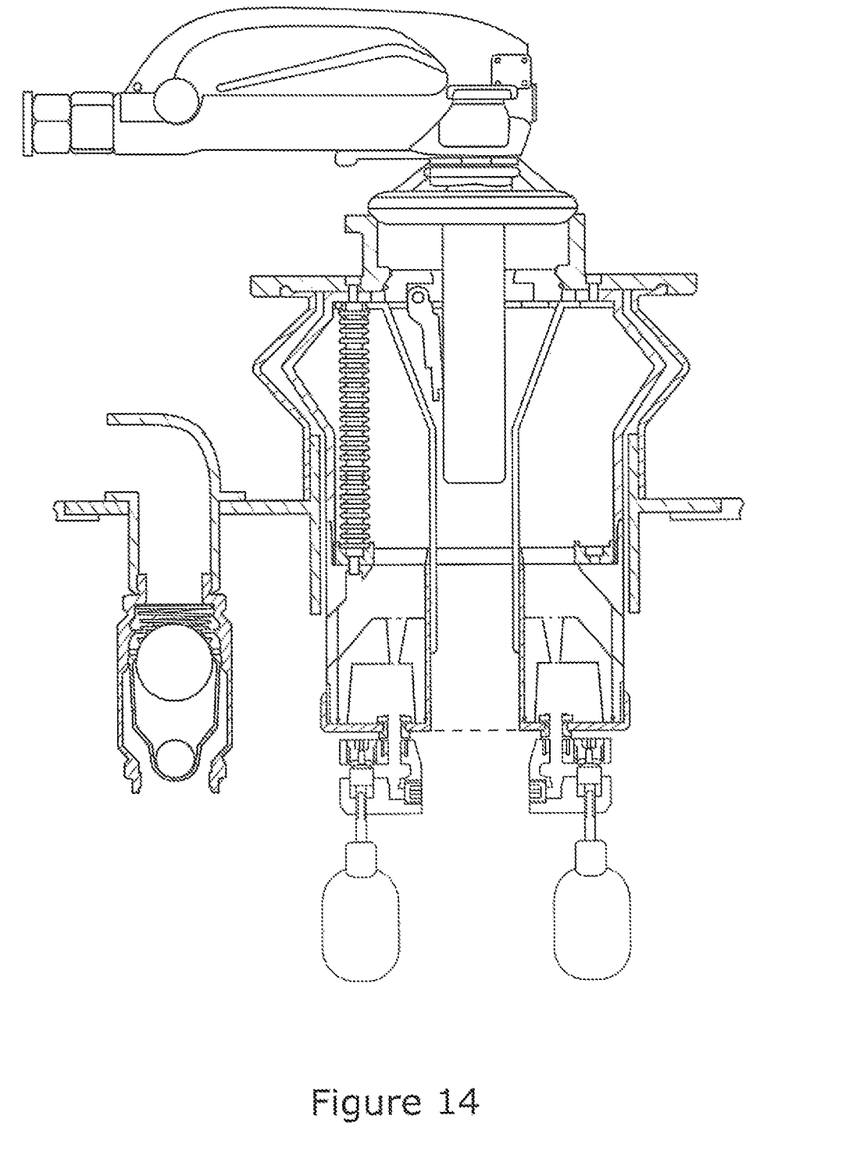
FIG. 14 shows gravity refuelling completing.

As shown in FIGS. 12 to 14, as an alternative to pressure refuelling, gravity refuelling from a gravity refuelling nozzle 80 is possible. The nozzle's spout 81 is passed through a central opening 82 in the dry break plug 35, displacing the pivoted closure 37. Refuelling can then proceed centrally through the secondary sleeve 38, the inner sleeve 22 and the annular float 53.

The present invention is not intended to be restricted to the details of the above described embodiment. For instance with reference to FIGS. 15, the bodies 101 of the pilot valves are secured to the end cap 120 not only by threaded port nozzles 102, but also screws 103. This arrangement directs valve exhausts 104 outwards and opposite parallel flats 105 inwards. The upper and lower drillings 106,107 in each body are made from its flat 105 and closed by screws 108, which secure float guides 109 to the body and the end cap. The guides have an outwards extending finger 110 also having a securing screw 111 closing a further drilling 112 in the body connecting the two drillings 106,107. The two guides have downwards extending tongues 113, which engage in opposite complementarily shaped sides of a central opening 114 in the annular float 153. The arrangement restrains rotation of the float with respect to the end cap. The annular float is an acetal body, which is buoyant in fuels such as diesel and kerosene. It can be of hollow two piece construction to enhance its buoyancy.

Figure 15:
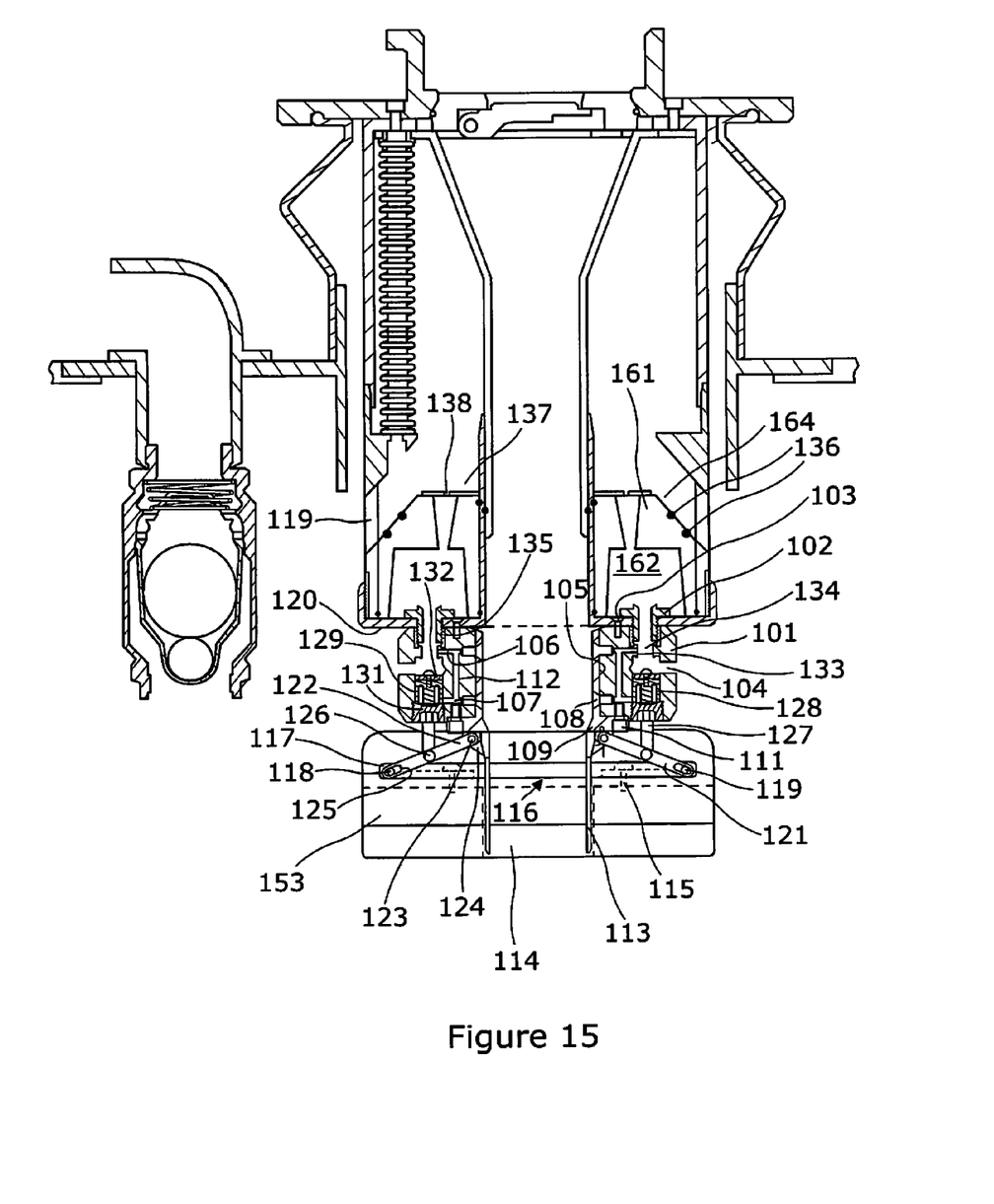
FIG. 15 is a view similar to FIG. 1 showing a variant of the refuelling coupling of FIG. 1.

The float has a groove in its top surface, in which is secured by screws 115 a channel shaped piece 116, having flanges 117 carrying at their outer ends cross pins 118. Offset from the central planes of the valve bodies, with appropriate length spacers 119, the pins carry links 121. The opposite ends 122 of the links are pinned 123 to points 124 on the guides 109. The tongues constrain the float to move translationally only on the central axis of the coupling, floating on fuel or hanging on the links. These have slots 125 at their outer ends to accommodate movement of the float up and down. At their midpoints, the links have further slots 126 via which at one side they are pinned to the stems 127 of valve pistons 128. The valve pistons are retained in bores 129 in the pilot valve bodies by centrally bored grub screws 131, which limit downwards movement of the pistons and hence of the links and the float.

The tops of the valve pistons carry sealing washers 132. Above the bores 129 in the valve bodies, sealing shoulders 133 are formed to concentrate sealing contact with the washers. Within the shoulders the bodies are open with central drillings 134 to threaded counter bores 135, which receive the port nozzles 102. The upper drillings 106 open into the drillings 134 and the lower drillings open into the bores 129 immediately above the grub screws.

Other differences from the first described embodiment are not only that the annular piston 161 carries a plurality of O-rings 136 to enhance its sealing, but also it carries a metering plate 137 on its top face to control flow through apertures 138 and hence the open underside 162 of the piston.

On initial refuelling, the fuel flows over the conical upper face 164 of the annular piston and out through the openings 119. A minor portion of the flow passes through the apertures 138 and out via the pilot valve exhausts 104. At least partially due to a pressure drop at the apertures 138, there is insufficient pressure below the piston to lift it. As the fuel level reaches the float, the pilot valve pistons 128 are lifted. Two effects occur. The pistons begin to obscure the exhausts 104. This has the effect of increasing that pressure below the annular piston, tending, but not at first actually lifting it. Secondly via the drillings 106, 112, 107, the increasing pressure beneath the annular piston is applied to the underside of the pilot valve pistons. As these are raised further, the flow out of the exhausts is closed by the valves. The same pressure is applied to the underside of the pistons as to their tops, but beneath over the full diameter of the bores 129 and above only over the diameter of the shoulders 133. The pilot valves block the flow from the exhausts completely. The process is repeated with the main annular piston 161, with pressure applied across its full lower diameter and less pressure applied to its conical upper face due to the proximity of the openings 119. As the annular piston rises, O-rings 136 constrain pumped fuel pressure to within the inner of the O-rings on the conical surface and the vented pressure within the tank is applied to the portion of the surface outwards of the outer of the O-rings. This pressure arrangement creates a force difference urging the annular piston to remain in its closed upper position, at least until the fuel supply pump is switched off due to the pressure rise due to the closure of the annular shut off valve.

Once the pumped pressure is switched off and sufficient fuel has been used for float to drop and the pilot valves to open, fuel can drain from below the annular piston. Either the annular piston will drop under its own weight or the next time pressure refuelling is started, the annular piston will be driven down by fuel pressure above it and at least initially merely air at vented pressure below it.

At no time is the central passage through the coupling obscured, allowing gravity refuelling as required.

The invention claimed is:

1. A refuelling coupling having a shut off valve, the refuelling coupling comprising:
   an annular member,
   a fitting on the annular member complementary to a pressure refuelling nozzle,
   a displaceable dry-break member in the coupling for normally sealing the coupling via a seal between the annular member and the dry-break member, the dry-break member being displaceable from its sealing position on connection of a pressure refuelling nozzle, and
   a primary sleeve extending from the annular member to provide a pressure flow passage for receiving pressurised fuel with the dry-break member displaced into the upstream end of the pressure flow passage, the primary sleeve having:
   peripheral openings at a downstream end of the sleeve for dispensing of the pressurised fuel flowing from the flow passage;
   the shut off valve comprising:
   an annular seat carried on the primary sleeve on the upstream side of the openings,
   an end cap of the sleeve having:
   an inner sleeve extending back towards the annular member and defining with the primary sleeve an annular cylinder closed by the end cap,
   an annular piston in the annular cylinder having:
   one or more openings allowing passage of pressurised fuel from within the primary sleeve to the opposite side of the annular piston and
   a formation complementary to the annular seat whereby pressurised fuel on the opposite side of the annular piston can co-operate with the annular seat and close the peripheral openings and
   a float valve with at least one closable outlet in the end cap arranged to be closed for movement of the annular piston against the annular seat when refuelling is reaching completion to close flow communication from the pressure flow passage to the openings.

2. A refuelling coupling having a shut off valve according to claim 1, wherein the annular piston has an annular groove in its underside and inlets to the groove in its top side.

3. A refuelling coupling having a shut off valve according to claim 2, wherein the inlets are provided in at least one metering component, preferably a metering plate secured to the top side of the annular piston, the or each meter component having at least one aperture for arranged to provide a pressure drop in fuel flowing through it into a respective one of the inlets.

4. A refuelling coupling having a shut off valve according to claim 1, wherein the primary sleeve is a compound member having:
   an upper portion secured to the annular member and,
   a lower portion having the annular seat.

5. A refuelling coupling having a shut off valve according to claim 1, wherein the annular seat is conical, facing obliquely inwards and downwards.

6. A refuelling coupling having a shut off valve according to claim 1, wherein the dry-break member is a plug urgeable to close the annular member and having:
   a secondary sleeve extending from the plug and within the primary sleeve, with the pressure flow passage therebetween,
   an aperture in the displaceable dry-break member and
   a subsidiary displaceable member carried by the dry-break member, this member normally closing the aperture and being displaceable by introduction of a gravity refuelling nozzle into the aperture and
   the secondary sleeve slidably engages with the inner sleeve and
   the end cap is open centrally,
   the arrangement being such that a gravity refuel nozzle can be passed through the aperture in the dry-break member for gravity refuelling through the secondary sleeve.

7. A refuelling coupling having a shut off valve according to claim 5, wherein the secondary sleeve extends within the inner sleeve.

8. A refuelling coupling having a shut off valve according to claim 6, including springs for urging the plug into its closed position.

9. A refuelling coupling having a shut off valve according to claim 8, wherein the springs are carried on pins extending from the valve seat to the annular member and acting on a rim extending radially of the plug.

10. A refuelling coupling having a shut off valve according to claim 5, wherein the diameter of the secondary sleeve is smaller than that of a displacer on the pressure refuelling nozzle, nett pressure force on the dry break member is such as to urge the plug sealingly against the displacer.

11. A refuelling coupling having a shut off valve according to claim 1, wherein the float of the float valve is annular with a central opening aligned beneath the central opening of the end cap for unimpeded flow of gravity refuelling fuel.

12. A refuelling coupling having a shut off valve according to claim 11, wherein the annular float valve is pivoted to one side and provided with a closure member at the other side for closing the end cap outlet under the annular piston.

13. A refuelling coupling having a shut off valve according to claim 11, wherein the annular float has a plurality of closure members for closing a corresponding plurality of end cap outlets.

14. A refuelling coupling having a shut off valve according to claim 13, wherein the closure members have tips for closing the outlets.

15. A refuelling coupling having a shut off valve according to claim 14, wherein the float valve is provided with a corresponding plurality of pilot valve bodies having radial exhausts, each having a radial passage or an axial passage interruptible by a respective one of the closure members upstream of its radial exhaust.

16. A refuelling coupling having a shut off valve according to claim 13, wherein the closure members are arranged to have passage flow pressure applied under them in a piston and cylinder manner, to ensure valve closure.

17. A refuelling coupling having a shut off valve according to claim 14, including guide members fast with the end cap for engaging with a central opening in the annular float and guiding it in movement towards and away from the end cap.

18. A refuelling coupling having a shut off valve according to claim 17, wherein the guide members are tongues engaging complementarily with the central opening in the annular float and the links are provided, connected at one end to the guides, at the other end to the annular float and intermediately to the closure members.

* * * * *